United States Patent Office 2,703,768
Patented Mar. 8, 1955

2,703,768

DRY LUBRICATION PROCESS AND PRODUCT

Ralph D. Hall, Woodland Hills, Calif., assignor to Electrofilm, Inc., North Hollywood, Calif., a corporation of California No Drawing. Original application April 26, 1950, Serial No. 158,335, now Patent No. 2,700,623, dated January 25, 1955. Divided and this application April 21, 1954, Serial No. 425,751

7 Claims. (Cl. 148—6.15)

This invention relates to processes for bonding or fusing graphite to surfaces and to the articles obtained thereby. This application is a division of my copending application Serial No. 158,335, filed April 26, 1950, which is a continuation-in-part of my application Serial No. 662,099, filed April 13, 1946, now abandoned.

Graphite has been known for many years to be one of the most successful dry lubricants ever discovered, and has been used alone for this purpose and also as an ingredient of lubricating compositions. However, dry graphite as ordinarily used, adheres to a friction surface for only a limited time and frequently requires replacement.

In accordance with my invention, graphite may be practically permanently bonded to the surface of the article being treated, and thus provide lubrication or protection for very long periods of time without any further treatment.

One object of my invention is to provide processes for bonding graphite to the surfaces of articles whereby the graphite is retained at least semi-permanently in a position to produce lubrication.

Another object of this invention is the production of articles with surfaces having substantial quantities of finely divided particles of graphite embedded, impregnated or diffused therein as distinguished from a mere coating of loose graphite particles.

A further object of this invention is to provide friction surfaces on articles with lubrication in the form of particles of graphite bonded and held securely thereto by means of a resinous bonding agent that is resistant to heat and pressure and that does not deteriorate in the presence of oils and other lubricants.

Other objects and advantages of the invention will be described and will be apparent from the following description of several embodiments of my invention.

In general, the application of graphite as a lubricant in accordance with my invention involves the steps of preparing the article surface or surfaces for coating, applying thereto finely divided graphite and one or more bonding agents, and completing the process of fixing the material in place, usually by means of a curing or baking treatment. The exact procedure to be followed will vary considerably depending upon the types of surfaces to be treated and the usage to which the coated surface is to be subjected.

For example, certain friction surfaces such as those composed of ordinary iron or steel may be prepared by either ordinary sandblasting or a phosphate type of coating treatment forming crystalline iron phosphates on the surface and well known commercially under the names "Parkerizing," "Bonderizing" or "Lubrizing." The surface obtained by the latter treatment is more resistant to corrosion than the plain iron or steel surface and receives readily a coating of finely divided graphite in a resinous vehicle. A suspension of the finely divided graphite in a resinous vehicle may be applied to the prepared surface in any suitable manner as by spraying, dipping, brushing or the like, and the coated surface is then heated or baked to cure the resinous material and form the desired bond. The graphite thus becomes embedded in and firmly bonded to the crystalline steel or iron surface.

The vehicle used for any of these coatings may be in liquid or paste form but should be carefully selected in order to obtain satisfactory results. The vehicle should contain a thermo-setting bonding agent capable of forming a strong bond that does not deteriorate under the influence of heat and pressure, that is resistant to the action of oils, lubricants, gasoline and the like, and that will not become brittle in use. Such a vehicle should also be capable of holding the graphite properly in suspension and not permitting it to settle out before or after the coating is applied.

One material that has been found particularly suitable as a vehicle for the coating is a preparation of the copolymers of vinyl chloride and vinyl acetate mixed with a thermo-setting resinous material, such as a "B" stage phenol formaldehyde resin. Other organic resins which may be used are the silicone resins, alkyd resins and other vinyl resins. The choice of bonding agent will depend largely on the use to which the graphitized surface is to be put and the nature of the surface that is coated. The use of a resinous bonding agent having a thermo-setting property is particularly desirable for assuming maximum permanency of the bonding effect.

Any of the customary solvents may be used to dilute or thin the resin solution. Although my invention is not limeted thereto, methyl ethyl ketone, methyl isobutyl ketone, acetone, ethylene dichloride and toluene are examples of suitable solvents that may be used as thinners.

Graphite in various forms may be used, although I prefer to use a natural flake graphite comminuted so that the majority of the particles do not exceed about 10 microns in size. The particular size of the particles, however, is not critical. The graphite is preferably used dry, in powder form, and may be incorporated with the vehicle by a simple agitation, by milling, by grinding or in any other manner to produce a uniform suspension. The following specific example of a coating operation is given by way of illustration, but should not be taken as limiting the invention to the details thereof.

*Example.*—The friction surfaces of an ordinary carbon steel shaft are cleaned and then coated by the commercial method known as "Lubrizing" in which the surfaces are subjected to the action of an acid solution of metal phosphates. The phosphate treated surfaces thus obtained are somewhat rough and have a crystalline appearance due to the formation of iron phosphates thereon. The surfaces are then further treated by spraying on them a suspension of very finely divided graphite in a resinous vehicle sold under the tradename of "Cordo 350." This resin is a mixture of different types of copolymers of a vinyl acetate and vinyl chloride with a somewhat smaller amount of "B" stage phenol-formaldehyde resin incorporated therein along with the usual plasticizer and solvent. In preparing the suspension of graphite, thinning solvent such as one of the usual hydrocarbons, ketones or the like may be added to the resin to obtain a liquid containing about 1–10% solids. The graphite may be added thereto in varying quantities from ¾ of a pound up to 3½ lbs. or more per gallon. For most purposes, one to two pounds of graphite per gallon is satisfactory, although this may be varied depending upon the final consistency of the suspension that is desired. This resin suspension is then sprayed on the phosphated surface, allowed to air dry and then baked, preferably at a temperature of 350° F. for 30 minutes. The graphitized surface thus obtained is thoroughly covered with minute particles of graphite firmly bonded to the metal.

While I prefer for most purposes to use graphite as the lubricating constituent in all of these compounds, other materials may be substituted for part of the graphite for certain applications. For example, if the graphitized surface is to have frictional contact with rubber, some of the graphite may be replaced with powdered mica or vermiculite. Also, for coating leaf springs high temperature bearings or equipment subjected to intense oxidation, up to 50% of the powdered graphite in the coating may be replaced with powdered molybdenum disulfide. In extreme cases, and particularly for articles such as the threads of stainless steel or aluminum bolts and nuts, various coil springs and the like, up to 90% of the powdered graphite may be replaced by molybdenum disulfide.

It will be apparent from the foregoing that my invention is applicable to a great many different kinds of surfaces, including not only such articles as the surfaces of gears, bearings, shafts and the like, but also to the friction surfaces of electrical switches, clutch and brake discs, doors and various other types of friction surfaces where lubrication is desired for easier operation or for better heat dissipation and longer life. Coatings applied in accordance with my invention may be made very thin so that the total thickness is only one thousandths of an inch or less, thus being satisfactory even though the tolerances permitted for the part being treated are very small. Thicker coatings, may, of course, be applied if desired.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A process for lubricating the surface of an element that is subjected in use to mechanical friction, that comprises treating the surface to form a large number of substantially microscopic irregularities therein, applying to the surface an abrasive-free coating mixture consisting essentially of liquid and a large number of finely divided solid lubricant particles distributed within the liquid in a proportion sufficient for coating of substantially said entire surface by the particles, said liquid including an uncured thermosetting polymerizable resin bonding agent, and baking the coating to polymerize and harden the thermosetting resin and thereby tightly bond the solid lubricant particles in place on said irregularized surface, said coating having upon drying a thickness under $1/1000$ of an inch.

2. A process as defined in claim 1, in which said solid lubricant includes graphite particles.

3. A process as defined in claim 1, in which said solid lubricant includes molybdenum disulfide particles.

4. A process as defined in claim 1, in which said surface irregularities are formed by phosphatizing of said surface.

5. A process as defined in claim 1, in which said surface irregularities are formed by sandblasting said surface.

6. A process as defined in claim 1, in which said coating mixture contains between about ¾ and 3½ pounds of said solid lubricant particles per gallon of said liquid.

7. An element having a surface that is subjected in use to mechanical friction and is coated with dry lubricant by the process defined in claim 1.

References Cited in the file of this patent

UNITED STATES PATENTS

| | | |
|---|---|---|
| 2,085,413 | Bloomenthal | June 29, 1937 |
| 2,534,406 | Bramberry | Dec. 19, 1950 |